US010077792B2

(12) United States Patent
Ortwein

(10) Patent No.: US 10,077,792 B2
(45) Date of Patent: Sep. 18, 2018

(54) DEVICE AND METHOD FOR FORMING AN ADHESIVE CONNECTION BETWEEN AN ARTICLE AND A SUPPORT

(71) Applicant: Glabete GmbH, Ebersbach (DE)

(72) Inventor: Angelika Ortwein, Ebersbach (DE)

(73) Assignee: Glabete GmbH, Edersbach (DE)

( * ) Notice: Subject to any disclaimer, the term of this patent is extended or adjusted under 35 U.S.C. 154(b) by 94 days.

(21) Appl. No.: 14/777,761

(22) PCT Filed: Mar. 31, 2014

(86) PCT No.: PCT/EP2014/056411
§ 371 (c)(1),
(2) Date: Sep. 17, 2015

(87) PCT Pub. No.: WO2014/166773
PCT Pub. Date: Oct. 16, 2014

(65) Prior Publication Data
US 2016/0273566 A1    Sep. 22, 2016

(30) Foreign Application Priority Data

Apr. 9, 2013  (DE) .................... 20 2013 101 505 U
Jun. 4, 2013  (DE) .................... 20 2013 005 065 U
Jul. 5, 2013  (DE) .................... 20 2013 102 982 U

(51) Int. Cl.
*F16B 11/00*    (2006.01)
*A47K 3/28*    (2006.01)
(Continued)

(52) U.S. Cl.
CPC ............ *F16B 11/006* (2013.01); *A47K 3/281* (2013.01); *A47K 3/38* (2013.01); *C09J 5/00* (2013.01);
(Continued)

(58) Field of Classification Search
CPC ...... A47K 3/281; A47K 3/38; A47K 2201/00; A47K 2201/02; A47K 2201/025;
(Continued)

(56) References Cited

U.S. PATENT DOCUMENTS 4,094,222 A * 6/1978 Lang ..................... F16B 13/143
411/15
4,425,065 A * 1/1984 Sweeney ............... F16B 13/143
156/92

(Continued)

FOREIGN PATENT DOCUMENTS

DE        4427055 C1    9/1995
DE    202009003176 U1    7/2010
(Continued)

OTHER PUBLICATIONS

Machine translation of DE 4427055 C1.*

*Primary Examiner* — Vishal I Patel
(74) *Attorney, Agent, or Firm* — Michael Soderman

(57) ABSTRACT

The invention relates to a device and a method for forming an adhesive connection between an object and a support. The object has a reservoir (4) with an adhesive agent that adjoins, at one contact surface, a wall (2) having a predetermined breaking point. The object has a button (7) with a push-through unit assigned to it; when the button (7) is actuated, the push-through unit creates a through-hole in the wall (2) of the reservoir (4), an adhesive agent is guided from the reservoir (4) through the hole onto the contact surface, and an adhesive layer (11) is formed to fasten the object to the support.

15 Claims, 3 Drawing Sheets

(51) Int. Cl.
*A47K 3/38* (2006.01)
*C09J 5/00* (2006.01)

(52) U.S. Cl.
CPC ....... *A47K 2201/00* (2013.01); *B32B 2419/00* (2013.01)

(58) Field of Classification Search
CPC ........ C09J 5/00; C09J 5/02; C09J 5/04; F16B 11/006; F16B 11/002; F16B 11/004; B32B 2419/00
See application file for complete search history.

(56) References Cited

U.S. PATENT DOCUMENTS

| | | | |
|---|---|---|---|
| 4,991,807 A * | 2/1991 | Radnich | A47K 5/02 248/206.3 |
| 2011/0100528 A1* | 5/2011 | Ronner | C09J 5/00 156/91 |
| 2011/0313098 A1* | 12/2011 | Ronner | C09J 5/00 524/588 |

FOREIGN PATENT DOCUMENTS

| | | |
|---|---|---|
| EP | 0900944 A1 | 3/1999 |
| WO | 8402960 A1 | 8/1984 |
| WO | 2007021170 A1 | 2/2007 |
| WO | 2009156013 A1 | 12/2009 |

* cited by examiner

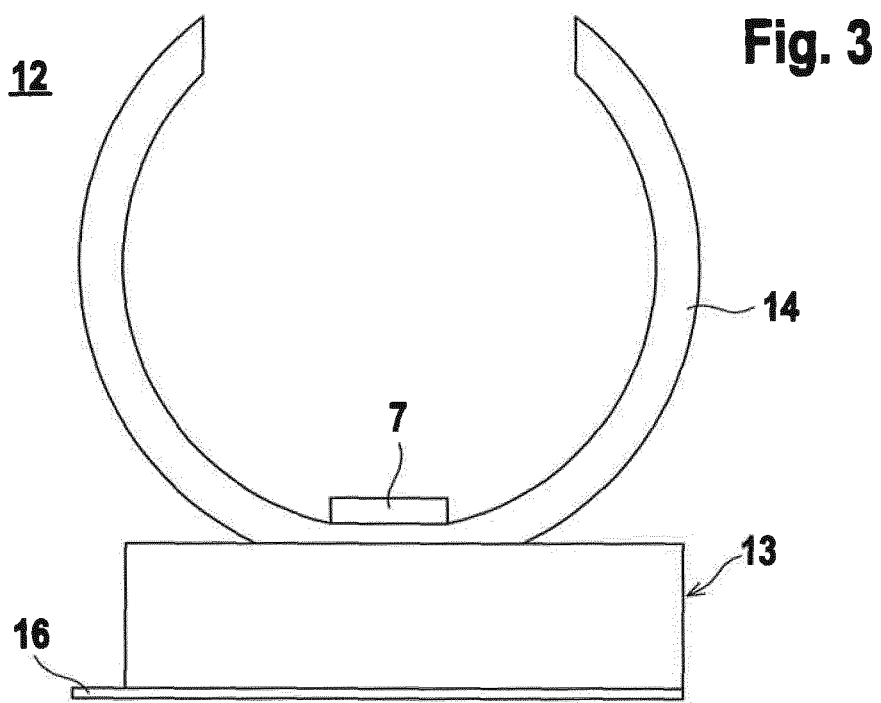

DEVICE AND METHOD FOR FORMING AN ADHESIVE CONNECTION BETWEEN AN ARTICLE AND A SUPPORT

CROSS-REFERENCE TO RELATED APPLICATIONS

This application is the U.S. national stage of International Application No. PCT/EP2014/056411 filed on Mar. 31, 2014, and claims the benefit thereof. The international application claims the benefit under 35 USC 119 of German Application Nos. DE 20 2013 102 982.3 filed on Jul. 5, 2013; DE 20 2013 005 065.9 filed on Jun. 4, 2013; and DE 20 2013 101 505.9 filed on Apr. 9, 2013; all applications are incorporated by reference herein in their entirety.

BACKGROUND

The invention relates to a device and a method for forming an adhesive bond between an object and a support.

Fittings and accessories in sanitary/bathroom facilities could be objects of this type, as an example.

Objects of this type have been fastened to walls of buildings with screws and dowels up to now. A drawback here is that holes have to be drilled into walls that are customarily covered with tiles. If the location of the objects is subsequently changed, the drill holes are exposed, which has a significant negative effect on the overall visual impression of the wall.

A fastening agent for affixing two objects is known from WO 2009/156013 A1 that is comprised of a mixture of an aerobic adhesive and a hydrophilic material. Objects can be attached to walls without screws by means of adhesive joints with that.

It is important for the application of the fastening agent that the components of the fastening agent are only mixed together shortly before the use of the fastening agent.

An installation set is provided for this that has two receptacles for separate storage of the aerobic adhesive and the hydrophilic material, in particular the hydrophilic support fibers. The components can then be removed from these receptacles in the desired amount to mix the fastening agent.

A drawback here is that this installation set is comprised of a number of individual parts that have to be carried along as an additional unit when systems of this type are assembled.

SUMMARY

The invention relates to a device and a method for forming an adhesive connection between an object and a support. The object has a reservoir (4) with an adhesive agent that adjoins, at one contact surface, a wall (2) having a predetermined breaking point. The object has a button (7) with a push-through unit assigned to it; when the button (7) is actuated, the push-through unit creates a through-hole in the wall (2) of the reservoir (4), an adhesive agent is guided from the reservoir (4) through the hole onto the contact surface, and an adhesive layer (11) is formed to fasten the object to the support.

DETAILED DESCRIPTION

The invention is based on the problem of providing a device and a method that make the creation of adhesive bonds between objects and supports possible with the lowest possible assembly expenses.

The features of the independent claims are provided to solve this problem. Advantageous embodiments and useful design developments of the invention are described in the dependent claims.

The invention relates to a device for forming an adhesive bond between an object and a support. The object has a reservoir with an adhesive agent that adjoins, at one contact surface, a wall having a predetermined breaking point. The object has a button with a push-through unit assigned to it; when the button is actuated, the push-through unit creates a through-hole in the wall of the reservoir, an adhesive agent is guided from the reservoir through the hole onto the contact surface, and an adhesive layer is formed to fasten the object to the support.

Furthermore, the invention relates to a corresponding method.

Consequently, the basic idea of the invention is for the adhesive agent that is required for the attachment to the support to be stored in the object itself. The adhesive agent is released in a simple way by the push of a button, meaning by actuating a button included on or in the object itself. When the button is pressed, the adhesive agent flows out of the reservoir and onto the contact surface and forms an adhesive layer there via which the object can be fastened to the support. The adhesive bond can consequently be created simply, quickly and in an extremely user-friendly way. A particular advantage is that absolutely no separate units or auxiliary means such as installation sets or the like are required to create the adhesive bond. Rather, only the button on the object has to be actuated by the user to create the adhesive bond. The button here can generally take the form of a push button or knob, meaning the button can be actuated by pressing or turning.

The functional principle for forming the adhesive layer is that when the button is actuated a push-through unit is actuated, meaning moved, in such a way that this push-through unit breaks through a predetermined breaking point of a wall of the reservoir, so the adhesive agent automatically flows from the reservoir through the through-hole formed in this way to the contact surface and creates the adhesive layer there.

It is advantageous when the push-through unit constitutes a punch or a spike.

Further, it is advantageous when the predetermined breaking point of the wand that can be penetrated by the push-through unit constitutes a foil, a membrane or a wall element made of a porous material.

In accordance with an advantageous embodiment, the object is prejoined to the support via prejoining agents.

The prejoining agents could be made up of an adhesive strip on the object via which the object is prejoined in its target position to the support. The contact surface and the support surface then border a closed hollow area that the adhesive agent can flow into after the button is actuated.

In accordance with a first variant of the invention, the button and the reservoir are integral parts of the object, meaning that the button and the assigned reservoir with an adhesive agent are already integrated into the object during the manufacturing process of the object.

In accordance with a second variant of the invention, the reservoir forms, along with the button, an assembly that is mounted in an object.

This assembly is subsequently built into the object. Accordingly, a recess is provided during the manufacturing process of the object in which the assembly can then be subsequently inserted. The assembly therefore constitutes an insertion component; this is advantageously designed in such a way that it can be used for different objects.

The assembly is advantageously mounted in the object without tools.

In particular, the assembly is fastened into the object via positive locking, a frictional connection, a plug connection, a snap-in connection, a clip connection, an adhesive bond, a Velcro connection or a screw connection.

In accordance with a first embodiment of the invention, the button constitutes a part that can be moved with respect to the object.

In that case, the button forms a separate part that is moved against the object. The reservoir is then preferably firmly connected to the object.

In accordance with a second embodiment of the invention, the object itself forms the button.

In that case, the reservoir is supported in a movable fashion in the object.

In that case, a separate part does not have to be provided to form the button, because the object itself takes on the function of the button.

In particular in this variant, the object can be adjusted relative to the reservoir when the button is actuated.

It is advantageous in the process when the object, as the button, is pressed by pressing against the reservoir, causing the adhesive layer to form on the contact surface and the object to be fastened to the support. The object can then still be adjusted when it is fastened because it can still be adjusted relative to the fixed reservoir, especially via a rotary movement, enabling the functionality of the overall system to be increased even more.

In accordance with a further variant of the invention, the adhesive agent is made up of an aerobic adhesive to which moisture is dispensed.

In that case, an adhesive agent that is known from DE 10 2009 003 176 A1 is used.

It is advantageous in that case when the reservoir has two separate receptacles; the aerobic adhesive is stored in a first receptacle, and a liquid, especially water, is stored in a second receptacle. The receptacles can then be broken open when the button is actuated so that the components of the adhesive agent can be mixed.

In accordance with a second variant of the invention, the adhesive agent is comprised of an aerobic adhesive and a hydrophilic material to which moisture is advantageously dispensed. The hydrophilic material can be made up of a hydrophilic support fiber, for instance, especially undried cotton.

In that case, an adhesive agent as described in WO 2009/156013 A1 is used.

The components of the adhesive are also stored in separate receptacles in this case; these receptacles are broken open when the button is actuated so that these components can be mixed to form the adhesive.

In accordance with a third variant, an aerobic adhesive is stored in the reservoir. A hydrophilic liner is provided on the contact surface to which moisture is preferably dispensed. When the button is actuated, the aerobic adhesive flows out of the reservoir and comes into contact with the hydrophilic liner.

In that case, an adhesive agent that is known from PCT/EP 2012/0641185 is used.

It is advantageous when aerobic adhesives that are made up of silane polymers are used for the cited adhesives.

In accordance with a further variant of the invention, the adhesive agent is made up of a multi-component adhesive.

The individual components of the adhesive can also be stored in separate receptacles of the reservoir in this case; the receptacles are broken open when the button is actuated so that the components are thoroughly mixed to form the adhesive.

The invention can be used to fasten objects of all kinds. In particular, the objects can be made up of furniture and furnishings and the like. Furthermore, the objects can be made up of products in the kitchen area and in the area of sanitary/bathroom facilities.

BRIEF DESCRIPTION OF THE DRAWINGS

The invention will be explained with the aid of the drawings below. The following are shown in the figures:

FIG. 3: Second variant of the device as per the invention in the case of a pipe clip.

DETAILED DESCRIPTION OF THE PREFERRED EMBODIMENTS

Figure 1A:
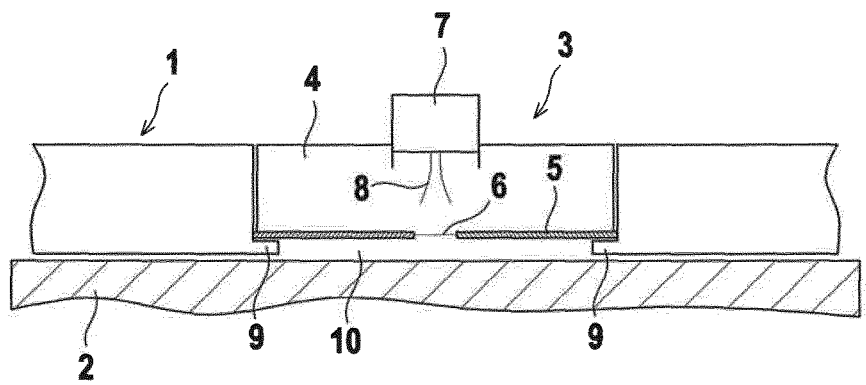
FIG. 1: First example of the device as per the invention in a shower rod
a) With a button that has not been actuated
b) During the actuation of the button
c) After actuation of the button
Figure 1B:
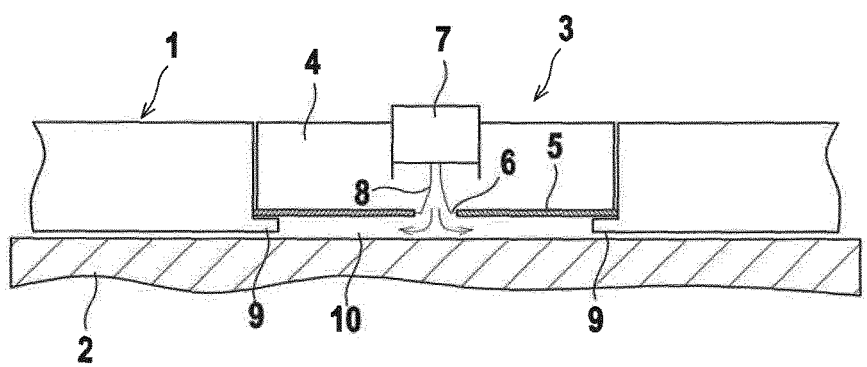
Figure 1C:
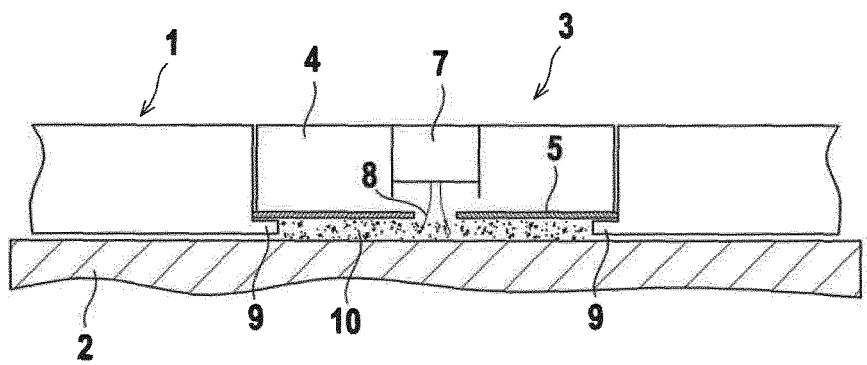

FIGS. 1*a* to 1*c* show a section of a shower rod 1, which forms an object, fastened to a wall 2, which forms a support, via adhesive bonds.

FIGS. 1*a* to 1*c* show a recess of the shower rod 1 into which the device as per the invention, in the form of an insertion component 3, is put to form the adhesive bond; the device is fixed in place via a snap-in connection that is not shown. In general, several devices of that type can be provided on the shower rod 1.

The device is comprised of a reservoir 4, in which an aerobic adhesive is stored. A hydrophilic plate 5 to which moisture is dispensed is located on the bottom of the reservoir 4. The hydrophilic plate 5 has a hole in its center. A membrane 6 that forms a predetermined breaking point of the wall 2 of the reservoir 4 is behind this hole. A button 7 is positioned in the wall 2 on the top of the reservoir 4. The button 7 can be moved in the axial direction when actuated, meaning that the button 7 takes the form of a push button. A punch 8, as a push-through unit, is located on the bottom of the button 7.

As FIGS. 1*a* to 1*c* show, the shower rod 1 is on the wall 2 and fixed in place in its target position on the wall by adhesive strips that are not shown. The edge of the shower rod 1 bordering the recess has two projections 9 that the device rests on. A closed hollow area 10 arises between the device and the wall 2 because of that. The projections 9 are dimensioned in such a way that the top of the device is flush with the top of the shower rod 1.

FIG. 1*a* shows the situation as long as the button 7 has not yet been actuated, meaning that the button 7 projects far over the top of the reservoir 4. The punch 8 is not engaged with the membrane 6 because of that. The reservoir 4 is completely closed because of the undamaged membrane 6, so the aerobic adhesive is completely stored in it.

FIG. 1*b* shows the situation during the actuation of the button 7. The button 7 is pressed downwards because of that, so the punch 8 makes contact with the membrane 6 and pierces through it. The aerobic adhesive can escape through the hole in the membrane 6 and flow into the hollow area 10, as the arrow in FIG. 1b illustrates.

FIG. 1c shows the final state when the button 7 is completely pressed into the reservoir 4 so that the top of the button 7 is flush with the top of the reservoir 4. The aerobic adhesive has now escaped from the reservoir 4, so it fills out the hollow area 10. The aerobic adhesive forms an adhesive agent with the hydrophilic plate there that can cure in the completely encapsulated hollow area 10, causing the formation of the adhesive layer 11 shown in FIG. 1c with which the shower rod 1 is fixed in place on the wall 2.

Figure 2A:
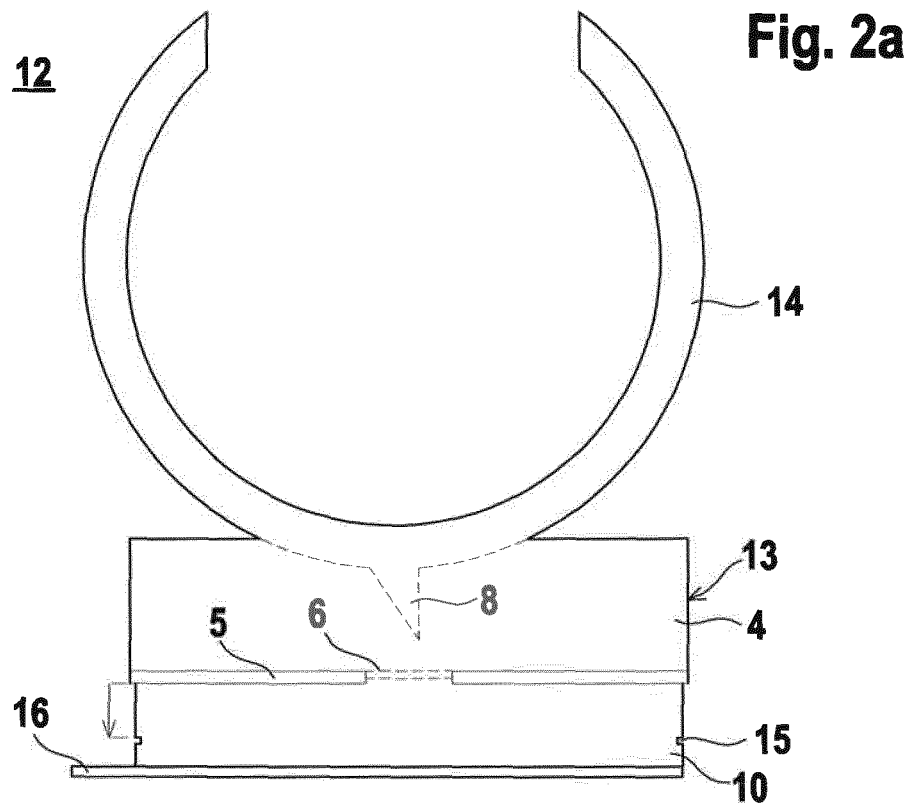
FIG. 2: First variant of a device as per the invention in the case of a pipe clip
a) Sectional view of the pipe clip
b) Plan view of the bottom of the pipe clip
Figure 2B:
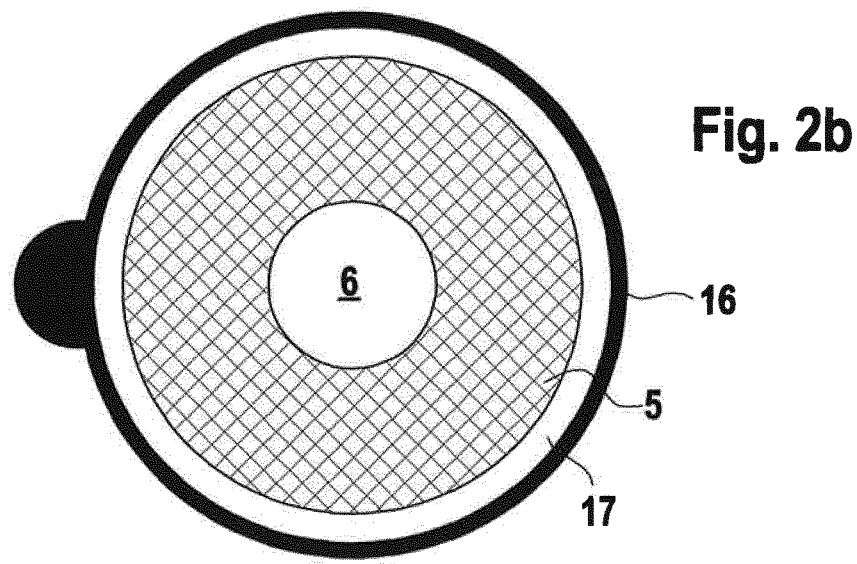

FIGS. 2a and 2b show an object in the form of a pipe clamp 12. The pipe clamp 12 has a hollow cylindrical base 13; a clip 14 that serves to hold a pipe, which is not shown, is fastened to the closed top of the base. The reservoir 4 projects over the open bottom side into the hollow area 10 of the base 13. The reservoir 4 with the aerobic adhesive stored in it, the punch 8 arranged in it and the membrane 6 on the bottom correspond to the embodiment of FIGS. 1a to 1c. In further conformity with this embodiment, a hydrophilic pate 5 is provided on the bottom of the reservoir 4; the membrane 6 is exposed behind the hold in the hydrophilic plate. The hydrophilic plate 5 is offset towards the inside vis-a-vis the edge of the reservoir 4. A groove 15 running around the circumference is provided on the outer surface of the reservoir 4. A cover 16 that conceals an adhesive strip is located on the lower edge of the reservoir 4. An overflow channel 17 that the excess adhesive can flow into is connected to the hydrophilic plate 5.

To attach the pipe clamp 12 to a support, the cover 16 is first removed and the lower edge of the reservoir 4 is then set upon the support with the adhesive strip as a prejoining agent and prejoined there.

A closed hollow area 10 is formed between the hydrophilic plate and the support because of that. In the case at hand, the entire pipe clamp 12 fulfills the button function by being pressed in an axial direction against the reservoir 4 until the lower edge of the base 13 audibly snaps into the groove 15. The membrane 6 is pierced by the punch 8 because of this actuation of the button, and aerobic adhesive flows out of the reservoir 4 again into the hollow area 10 between the hydrophilic plate and the receptacle. An adhesive layer 11 thereby forms again with which the object, meaning in this case the pipe clamp 12, is attached to the support.

The pipe clamp 12 can then still be turned in the groove 15 and adjusted in that way. An adjustment position can be fixed in place with a pin that is not shown.

FIG. 3 shows a variant of the pipe clamp 12 in accordance with FIGS. 2a and 2b. The reservoir 4 is completely positioned in the hollow area 10 of the base 13 in this case; the reservoir 4 is fastened there and is consequently not able to be moved to the base 13. The reservoir 4 with the hydrophilic plate (not shown in FIG. 3) lies in the interior of the hollow area 10 and is offset towards the inside with respect to the edge of the base 13. An adhesive strip that is concealed by the cover 16 is applied in this case to the lower edge of the base 13.

To mount the pipe clamp 12, it is set down with the adhesive strip on the support on the lower edge of the base 13 and prejoined there. In the embodiment in accordance with FIG. 3, the button 7 takes on the button function as a separate component. When the button 7 exposed on the clip 14 is actuated, the punch 8 pierces the membrane 6 so that the aerobic adhesive can flow out of the reservoir 4 to form the adhesive layer 11.

LIST OF REFERENCE NUMERALS (1) Shower rod
(2) Wall
(3) Insertion component
(4) Reservoir
(5) Hydrophilic plate
(6) Membrane
(7) Button
(8) Punch
(9) Projection
(10) Hollow area
(11) Adhesive layer
(12) Pipe clamp
(13) Base
(14) Clip
(15) Groove
(16) Cover
(17) Overflow channel

The invention claimed is:

1. Device for forming an adhesive bond between an object and a support, wherein the object has a reservoir (4) with an adhesive agent that adjoins, at a contact surface, a wall (2) having a predetermined breaking point and wherein the object has a button (7) with a push-through unit assigned to it, wherein the push-through unit creates a through-hole in the predetermined breaking point of the wall (2) of the reservoir (4) when the button is actuated, the adhesive agent is guided out of the reservoir (4) through the through-hole onto the contact surface, and an adhesive layer (11) forms to fasten the object to the support, characterized in that the reservoir (4) has two separate receptacles, that an aerobic adhesive is stored in a first receptacle as a first component of the adhesive agent, that a liquid or a hydrophilic material to which moisture is dispensed is stored in a second receptacle as a second component of the adhesive agent, and that the receptacles are broken open when the button (7) is pushed, so that the components of the adhesive agent are mixed together.

2. Device according to claim 1, characterized in that the push-through unit constitutes a punch (8) or a spike.

3. Device according to claim 1, characterized in that the predetermined breaking point of the wall (2) that can be pierced by the push-through unit constitutes a foil, a membrane (6) or a wall element made up of a porous material.

4. Device according to claim 1, characterized in that the object is prejoined to the support via a prejoining agent.

5. Device according to claim 1, characterized in that the reservoir (4) forms along with the button (7) an assembly mounted in the object.

6. Device according to claim 5, characterized in that the assembly is mounted in the object without tools.

7. Device according to claim 5, characterized in that the assembly is fastened into the object via positive locking, a frictional connection, a plug connection, a snap-in connection, a clip connection, an adhesive bond, a Velcro connection or a screw connection.

8. Device according to claim 1, characterized in that the button (7) constitutes a part that can be moved with respect to the object.

9. Device according to claim 1, characterized in that the object itself constitutes the button (7).

10. Device according to claim 9, characterized in that the reservoir (4) is supported in a movable fashion in the object.

11. Device according to claim 9, characterized in that the object can be adjusted relative to the reservoir (4) when the button (7) is actuated.

12. Device according to claim 1, characterized in that the adhesive agent is made up of a multi-component adhesive.

13. Device according to claim 1, characterized in that the adhesive agent is made up of a single-component aerobic adhesive to which moisture is dispensed.

14. Device according to claim 1, characterized in that the adhesive agent has an aerobic adhesive and a hydrophilic material as components, wherein moisture is dispensed to at least one component.

15. Method for forming an adhesive bond between an object and a support, wherein a reservoir (4) with an adhesive agent is provided in or on the object, said reservoir adjoining, at a contact surface, a wall (2) having a predetermined breaking point and wherein the object has a button (7) with a push-through unit assigned to it, wherein the push-through unit is actuated in such a way when the button (7) is actuated that said push-through unit creates a through-hole in the predetermined breaking point of the wall (2) of the reservoir (4), wherein the adhesive agent is guided out of the reservoir (4) through the through-hole and then onto the contact surface, and forms an adhesive layer (11) there via which the object is fastened to the support, characterized in that the reservoir (4) has two separate receptacles, that an aerobic adhesive is stored in a first receptacle as a first component of the adhesive agent, that a liquid or a hydrophilic material to which moisture is dispensed is stored in a second receptacle as a second component of the adhesive agent, and that the receptacles are broken open when the button (7) is pushed, so that the components of the adhesive agent are mixed together.

* * * * *